United States Patent [19]

Shim

[11] 3,887,655
[45] June 3, 1975

[54] PHOSPHORAMIDATE ESTERS OF DIBROMONEOPENTYLGLYCOL

[75] Inventor: Kyung S. Shim, Irvington, N.Y.

[73] Assignee: Stauffer Chemical Company, Westport, Conn.

[22] Filed: Aug. 20, 1973

[21] Appl. No.: 389,829

Related U.S. Application Data

[63] Continuation of Ser. No. 252,680, May 12, 1972, abandoned, which is a continuation of Ser. No. 35,269, May 6, 1970, abandoned.

[52] U.S. Cl. ........... 260/937; 106/138; 260/45.8 N; 260/45.9 R; 260/239 D; 260/239 EP; 260/239 B; 260/293.65; 260/326.61; 260/974; 260/984
[51] Int. Cl. ............................................. C07f 9/24
[58] Field of Search ...................... 260/937

[56] References Cited
UNITED STATES PATENTS

| | | | |
|---|---|---|---|
| 3,033,887 | 5/1962 | Wadsworth et al. | 260/937 |
| 3,033,888 | 5/1962 | Wadsworth et al. | 260/937 |
| 3,159,664 | 12/1964 | Bartlett | 260/937 |
| 3,597,503 | 8/1971 | Wilson et al. | 260/937 |

OTHER PUBLICATIONS

Edmundson et al., Index Chemicus, Vol. 32, No. 12, (3-17-69), 109119.

*Primary Examiner*—Lorraine A. Weinberger
*Assistant Examiner*—Richard L. Raymond

[57] ABSTRACT

Novel phosphoramidate esters of dibromoneopentylglycol are prepared, e.g. by reacting a benzene solution of 2,2'-bis bromomethyl-1,3-propanediol with $POCl_3$ to make an intermediate. Dimethylamine is reacted with the intermediate to made the following structure:

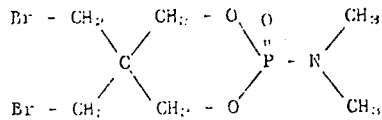

These materials are useful as flame retardants when blended into polymeric materials.

3 Claims, No Drawings

PHOSPHORAMIDATE ESTERS OF DIBROMONEOPENTYLGLYCOL

CROSS-REFERENCE TO RELATED APPLICATIONS

The present application is a continuation of Ser. No. 252,680, filed May 12, 1972, now abandoned, which in turn was a continuation of the parent application, Ser. No. 35,269, filed May 6, 1970, now abandoned.

This invention relates to novel compositions of matter. In particular, this invention relates to the preparation of esters of dibromoneopentylglycol. The novel phosphoramidate esters of dibromoneopentylglycol prepared in accordance with the present invention are useful particularly as flame retardants. The novel halophosphonate esters of dibromoneopentylglycol are intermediates in the preparation of compositions including the phosphoramidate esters of this invention.

The novel phosphoramidate esters of dibromoneopentylglycol are represented by the following formula:

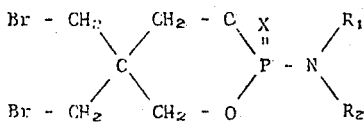

In the above formula, X is oxygen or sulfur; $R_1$ and $R_2$ are the same or different alkyl group having from 1 to 8 carbon atoms and preferably from 1 to 4 carbon atoms, hydrogen, or phenyl. $R_1$ and $R_2$ can form a single alkylene ring compound containing 2, 4, 5 or 6 carbon atoms such as the aziridine, piperidine, pyrolidine, or hexamethyleneimine rings.

The novel compounds of the present invention are efficient flame retardants when incorporated in various polymers or other flammable substrates. In general, the novel compositions of this invention are useful as flame retardants in a wide range of compositions such as, for example, polymethylmethacrylates, cellulose acetates, rayon, polyesters, polyphenyleneoxides, flexible as well as rigid polyurethanes, polystyrene, ABS-type polymers, polyethylene, polypropylene, nylon, polyvinyl chloride, polyethylene oxide, polypropylene oxide, paper, textiles such as cotton fabrics and the like.

The amount of novel compound which is necessary to give commercially satisfactory flame retardance in any particular polymer or substrate system will vary over a wide range. Usually between about 1 to 50% (on a weight basis) of the flame retardant material is employed. Preferably, between about 5 and about 10% is used. In general, any suitable known method of incorporating flame retardant materials may be employed. Blending the additive materials with the prepolymers prior to formation of the polymeric material is one preferred method of achieving the desired, final flame retarded polymer.

While it is generally recognized that compositions containing bromine improve the flame retardants of polymers many bromine containing compounds are unsatisfactory by reason of their instability. These compounds are known to dehydrobrominates when incorporated in polymers and permitted to stand at room temperature. The compositions of the present invention exhibit improved stability, particularly improved light stability, as well as excellent fire retardancy characteristics.

The present invention also provides novel intermediates for the preparation of compounds including the phosphoramidate esters. The novel intermediates have the following formula:

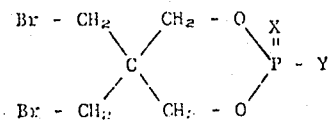

In the above formula, X is oxygen or sulfur and Y represents chlorine or bromine. In addition to being useful as intermediates in the preparation of the novel phosphoramidate flame retardant of retardants present invention, these compositions provide reactive intermediates for preparation of a wide class of compositions of matter.

The novel compositions of the present invention are prepared generally in the following manner. Dibromoneopentylglycol is reacted with a suitable phosphorus oxy halide in a suitable solvent at a temperature, for example, between room temperature and 100°C. until hydrogen halide evolution is essentially complete in order to make the halophosphonate ester of dibromoneopentylglycol.

The general method of preparation of the novel compounds of this invention is represented by the following equations:

(1) 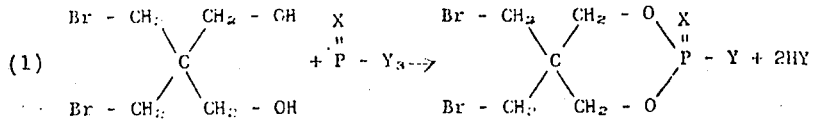

Suitable phosphorus oxyhalides include phosphorus oxychloride, phosphorus oxybromide, and phosphorus thiochloride.

(2) 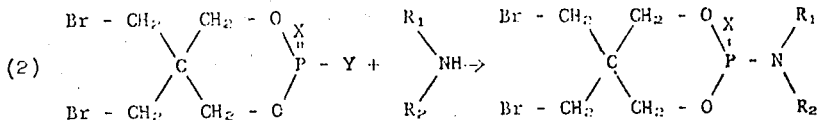

wherein X, Y, R₁ and R₂ have the significance previously stated. Suitable amines include n-butylamine, methylamine, ethylamine, propylamine, cyclohexylamine, aniline, di-n-butylamine, di-i-propylamine, dimethylamine and diethylamine.

Having described the invention in general terms, reference is now made to specific examples which should not be construed as unduly limiting thereof:

EXAMPLE 1

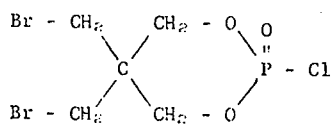

A benzene solution (450 ml. of benzene) of 2,2'-bis-bromoethyl-1,3-propanediol (261.8 gr:1 mol) is reacted with POCl₃ (153.3 gr:1 mol) at 50°C. over a period of 6 hours until HCl gas ceased to evolve. NMR and IR analysis confirms the structure set forth above.
Phosphorus Analysis
calculated: wt. % P = 9.05
found: wt. % P = 9.00

EXAMPLE 2

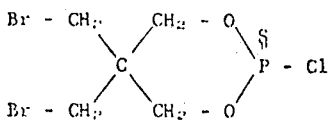

This compound is made by the same procedure as set forth in Example 1 except that PSCl₃ is used instead of POCl₃.

EXAMPLE 3

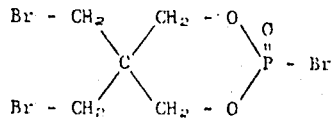

This compound is made by the same procedure as set out in Example 1 except that POBr₃ is used instead of POCl₃.

EXAMPLE 4

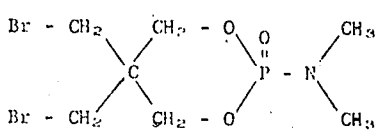

The intermediate product is prepared by the procedure of Example 1. After evolution of HCl gas has ceased dimethylamine (90 gr:2 mol) is added slowly at a temperature maintained below 10°C. Solvent and other volatiles are removed in a rotary evaporator to give a white crystalline solid. The solid is dissolved in chloroform and amine hydrochloride is removed by water washings. Upon removal of chloroform, a white crystalline solid is obtained. Yield is (297 gr; 84.5% by wt.) MP = 119°–121°C.

| Analysis: | Found | Theory |
|---|---|---|
| MW | 351 By Mass Spec. | 350.8 |
| %Br | 45.0 | 45.5 |
| %P | 9.0 | 8.82 |
| %N | 4.2 | 3.99 |

EXAMPLE 5

The following compounds are prepared by the procedures of Examples 1 and 4 by substituting the appropriate phosphorus trichloride and amine reactants:

(5)
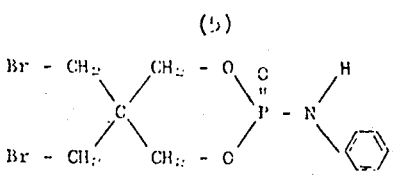

(6)
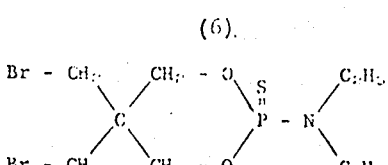

(7)
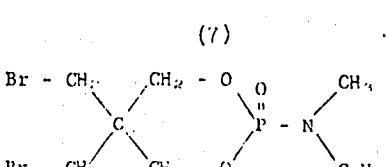

(8)
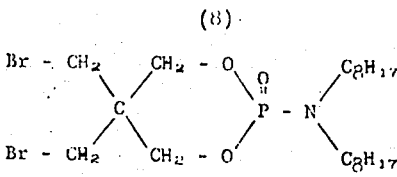

(9)
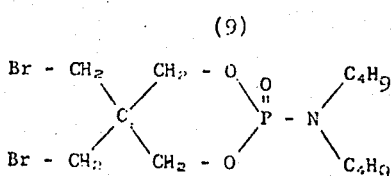

(10)
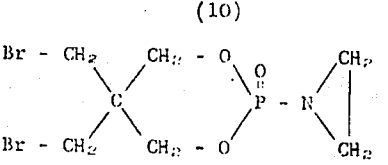

(11)
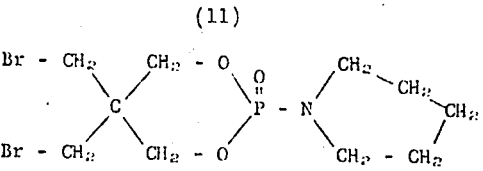

(12)

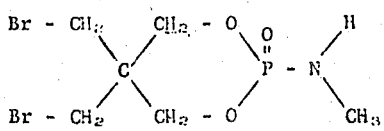

The compounds produced by Example 4 was evaluated by incorporating or adding the specified amounts thereof to the materials shown in the following tables. The fire retardancy of the resulting materials was then quantitatively evaluated by determining their Limiting Oxygen Index (LOI) by means of the procedure described by Fenimore and Martin in the November 1966 issue of Modern Plastics. In brief, this procedure directly relates flame retardancy to a measurement of the minimum percentage concentration of oxygen in a oxygen:nitrogen mixture which permits the sample to burn; the LOI being calculated as follows:

$$LOI = \left( \frac{[O_2]}{[O_2] + [N_2]} \right) \times 100.$$

Thus, a higher LOI is indicative of a higher degree of flame retardancy.

TABLE 1

| LOI in Rayon | wt. % Add on | LOI |
|---|---|---|
| Br-\__O\_PN(CH₃)₂ (Br-\__O/) | 18.2 | 29.54 |
|  | 17.2 | 28.28 |
|  | 7.9 | 25.46 |
| (CH₂—CH—CH₂O)₃P=O, BR Br | 19.7 | 27.70 |
|  | 15.8 | 25.90 |
|  | 8.8 | 24.50 |
| [PN(OC₃H₇)₂]ₙ | 18.8 | 26.4 |
|  | 8 | 22.5 |

TABLE 2

Flame test in flexible polyurethane foam

| | wt.% Add On | Flammability |
|---|---|---|
| Br-\__O\_PN(CH₃)₂ | 10 | Self extinguishing |
| (ClCH₃CH₂O)₃P→O | 10 | Burn |

TABLE 3

| LOI in polyphenylene oxide | wt. % Add On | LOI |
|---|---|---|
| Br-\__O\_PN(CH₃)₂ | 5 | 29.4 |
| (C₆H₅)₃P→O | 5 | 26.9 |

TABLE 4

| LOI in PMMA | wt.% Add On | LOI |
|---|---|---|
| Br-\__O\_PN(CH₃)₂ | 20 | 24.5 |
| (CH₂CH—CH₂O)₃P→O, Br Br | 20 | 23.3 |

TABLE 5

Flame test in polyethylene terephthalate (polyester)

| | wt.% Add On | Flammability |
|---|---|---|
| Br-\__O\_PN(CH₃)₂ | 5 | Self extinguishing |
| (C₆H₅O)₃P →O | 5 | Burn |

TABLE 6

Flame test in cellulose acetate

| | wt. % Add On | Flammability |
|---|---|---|
| Br-\__O\_PN(CH₃)₂ | 5 | Self extinguishing |
| (ClCH₂CH₂O)₃P→O | 5 | Burn |

EXAMPLE 13

The following illustrates a specific example of a method of incorporating the novel esters of this invention in a polymeric material. Methyl methacrylate (80% by weight) was mixed with (20% weight) N,N'-dimethylphosphoramidate ester of dibromoneopentylglycol and 200 ppm of azo-bis-isobutylonitrile at room temperature. The resulting mixture was heated at 80°C. in a closed vessel over a period of 6 hours to obtain a flame retarded polymethylmethacrylate. The LOI results are given in Table 4, supra.

What is claimed is:

1. Compositions of matter in accordance with the formula:

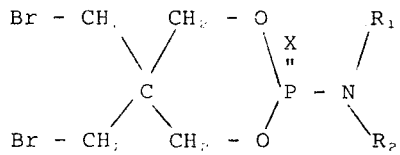

wherein X is oxygen or sulfur, $R_1$ and $R_2$ are the same or different and are selected from the group consisting of alkyl containing from 1 to 10 carbon atoms, hydrogen, and phenyl.

2. The composition of claim 1 wherein X is oxygen, and $R_1$ and $R_2$ are each methyl.

3. The composition of claim 1 wherein X is sulfur, and $R_1$ and $R_2$ are each ethyl.

* * * * *

UNITED STATES PATENT AND TRADEMARK OFFICE
CERTIFICATE OF CORRECTION

PATENT NO. : 3,887,655
DATED : June 3, 1975
INVENTOR(S) : Kyung S. Shim

It is certified that error appears in the above-identified patent and that said Letters Patent are hereby corrected as shown below:

Page 1, change "irvington" to -- Irvington --;
Page 1, Abstract, line 5, Change "made" to -- make --;
Column 2, line 37, after "flame" delete "retardant of" and after "retardants" insert -- of the --;
Column 3, line 17, change "bromoethyl-1,3-propanediol" to -- bromomethyl-1,3-propanediol --.

Signed and Sealed this second Day of September 1975

[SEAL]

Attest:

RUTH C. MASON
Attesting Officer

C. MARSHALL DANN
Commissioner of Patents and Trademarks